US011986834B2

(12) United States Patent
Hurt

(10) Patent No.: US 11,986,834 B2
(45) Date of Patent: May 21, 2024

(54) ROCK CRUSHER HAVING PRIMARY AND AUXILIARY CRUSHING MECHANISMS

(71) Applicant: Charles K Hurt, Lynchburg, VA (US)

(72) Inventor: Charles K Hurt, Lynchburg, VA (US)

( * ) Notice: Subject to any disclaimer, the term of this patent is extended or adjusted under 35 U.S.C. 154(b) by 86 days.

(21) Appl. No.: 17/152,863

(22) Filed: Jan. 20, 2021

(65) Prior Publication Data

US 2022/0226833 A1 Jul. 21, 2022

(51) Int. Cl.

*B02C 19/16* (2006.01)
*B02C 1/00* (2006.01)
*B02C 1/04* (2006.01)

(52) U.S. Cl.

CPC .............. *B02C 19/16* (2013.01); *B02C 1/005* (2013.01); *B02C 1/04* (2013.01)

(58) Field of Classification Search

CPC .. B02C 1/00; B02C 1/005; B02C 1/02; B02C 1/04; B02C 1/043; B02C 1/046; B02C 1/06; B02C 1/08; B02C 1/10

See application file for complete search history.

(56) References Cited

U.S. PATENT DOCUMENTS

| | | | | | |
|---|---|---|---|---|---|
| 1,997,214 | A * | 4/1935 | Guest | B02C 1/06 | 241/289 |
| 3,473,741 | A * | 10/1969 | Bodine | B02C 1/00 | 241/1 |
| 4,629,135 | A * | 12/1986 | Bodine | B02C 19/18 | 241/1 |
| 5,839,672 | A * | 11/1998 | Zarogatsky | B02C 1/043 | 241/266 |
| 2014/0042253 | A1 | 2/2014 | Miller | | |

FOREIGN PATENT DOCUMENTS

| | | | | |
|---|---|---|---|---|
| CN | 108745459 | | 6/2018 | |
| CN | 109622176 | A * | 4/2019 | B02C 1/043 |
| CN | 111871495 | A * | 11/2020 | B02C 1/043 |
| DE | 102012009989 | A1 * | 11/2013 | B02C 1/04 |
| FR | 2697175 | A1 * | 4/1994 | B02C 1/02 |
| GB | 190915884 | | 5/1910 | |
| RU | 165227 | U1 * | 10/2016 | B02C 1/04 |
| WO | WO-9009240 | A1 * | 8/1990 | B02C 1/04 |

OTHER PUBLICATIONS

Translation of CN-109622176 (Year: 2019).*
Translation of RU-165227 (Year: 2016).*
Translation of FR-2697175 (Year: 1994).*
Translation of WO-9009240 (Year: 1990).*
Translation of CN-111871495 (Year: 2020).*
Baer, Translation of DE-102012009989 (Year: 2013).*
Bouley, Translation of WO-9009240 (Year: 1990).*

* cited by examiner

*Primary Examiner* — Bobby Yeonjin Kim

(74) *Attorney, Agent, or Firm* — Laubscher & Fretwell, P.C.

(57) ABSTRACT

A rock crushing device includes a housing with a plurality of walls defining a chamber that has an upper inlet and a lower outlet. At least one of the walls is movable relative to another wall to define a primary compression assembly for crushing rocks within the chamber via mechanical force. There is an auxiliary crushing assembly connected with at least one of the walls to deliver a vibratory force to at least one wall for crushing rocks within the chamber. The auxiliary crushing assembly is operable together with the primary compression assembly or independent of it.

8 Claims, 3 Drawing Sheets

ROCK CRUSHER HAVING PRIMARY AND AUXILIARY CRUSHING MECHANISMS

BACKGROUND OF THE DISCLOSURE

The present disclosure relates to a device for crushing rocks, and more specifically to a rock crusher with a primary and auxiliary crushing mechanism.

Rock crushers are known in the art. They are apparatuses designed to reduce large rocks into smaller rocks, gravel or dust. Standard rock crushers, such as a jaw crusher and gyratory crusher, function by placing material between two solid surfaces, applying a force that causes one or more of the surfaces to move, and in turn fracturing the material. For both jaw crushers and gyratory crushers, the chamber in which material is placed progressively narrows in a downward direction to allow larger pieces of material to be progressively made smaller until a desired size is reached.

For these crushers, a compression force is applied to the material within the crushing chamber to stress the material, ultimately causing it to fracture. The stress needed to fracture material will vary with the size and material to be crushed. Certain types and sizes of rock will require a high compression force to reach the stress threshold needed to fracture the rock, and therefore these rock crushing apparatus need to withstand a high level of stress as well. Rock crushing, whether crushing material with a high-stress fracture point or an abundance of material, can result in high-energy demands and significant amounts of time to continually provide the compression force needed to fracture rocks.

Thus, there is a need for an apparatus that, through additional or alternative force, can reach or surpass fracture inducing stress levels more easily and efficiently than those currently used in the industry.

SUMMARY OF THE DISCLOSURE

Accordingly, it is an object of the present disclosure to provide a rock crushing device that includes a housing with a plurality of walls defining a chamber that has an upper inlet and a lower outlet. At least one of the walls is movable relative to another wall to define a primary compression assembly for crushing rocks within the chamber via mechanical force. There is an auxiliary crushing assembly connected with at least one of the walls to deliver vibrations to the wall for crushing rocks within the chamber via a vibratory force. The rock crushing device is operable via the primary compression assembly and auxiliary assembly together, or via the primary assembly alone with the auxiliary assembly force independently applied as needed. Preferably, the auxiliary crushing assembly includes one of a piezoelectric and hydraulic device.

In one embodiment, the housing has a generally rectangular configuration and includes a first pair of parallel spaced side walls and a second pair of side walls arranged perpendicular to the first pair. At least one of the second pair of side walls is movable relative to the other side wall between a receiving position and crushing position. For the receiving position, the second pair of side walls are spaced by a first distance, and for the crushing position, the second pair of side walls are spaced by a second distance less than the first distance. The auxiliary crushing assembly is connected with the second pair of side walls. Preferably, the movable side wall is spaced a greater distance at the top than at the bottom.

In another embodiment, the auxiliary crushing assembly provides variable frequency vibration forces, including high and low frequency forces, and both of the two opposed side walls are movable.

In yet another embodiment, the housing has a generally circular configuration including an inner wall and an outer wall concentrically arranged in spaced relation relative to the inner wall. In this embodiment, the inner chamber is defined between the inner and outer walls, and the inner wall is movable relative to the outer wall. Preferably, the inner wall has a conical configuration and the outer wall has an inner diameter at a top portion greater than an inner diameter at a bottom portion. An auxiliary crushing assembly is connected with both walls or one wall.

BRIEF DESCRIPTION OF THE FIGURES

Other objects and advantages of the disclosure will become apparent from a study of the following specification when viewed in the light of the accompanying drawing, in which.

DETAILED DESCRIPTION

The present disclosure is directed toward a rock crusher having primary and auxiliary rock crushing mechanisms. The primary mechanism provides an initial rock crushing compression force and the auxiliary mechanisms provides vibratory force to increase the peak stress of the rock. The term "rock" is used to describe material that is crushed by the rock crushers disclosed herein. It will be understood by those with skill in the art that other material that can be crushed, fractured, or otherwise reduced in size can be used with the rock crushers.

Figure 1:
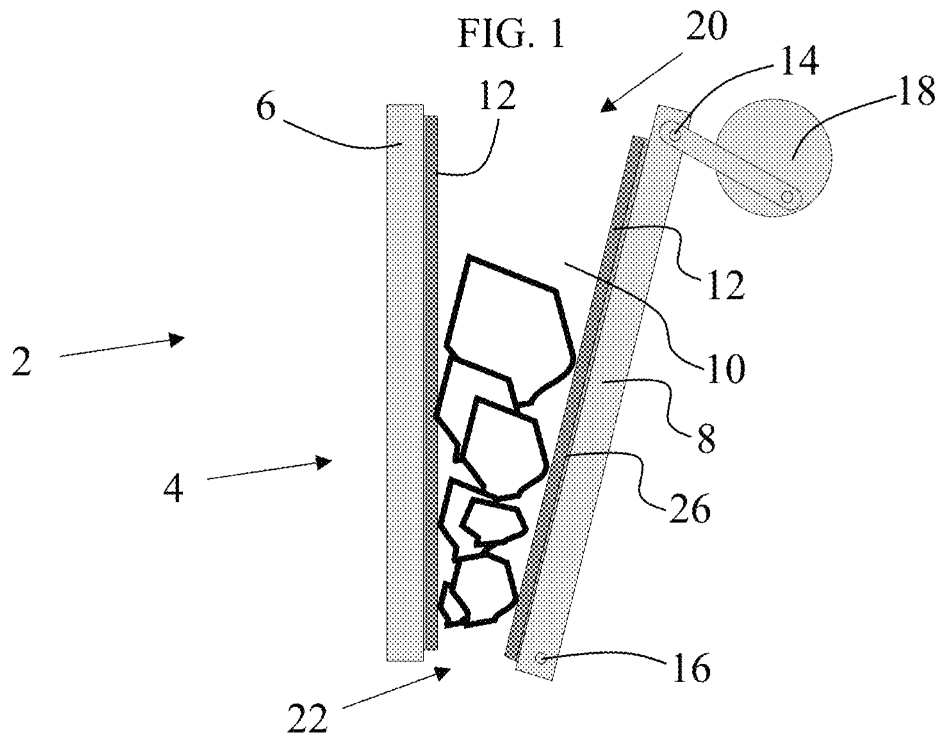
FIGS. 1 and 2 show a side view of a first embodiment of a rock crusher having primary and auxiliary crushing mechanism.
Figure 2:
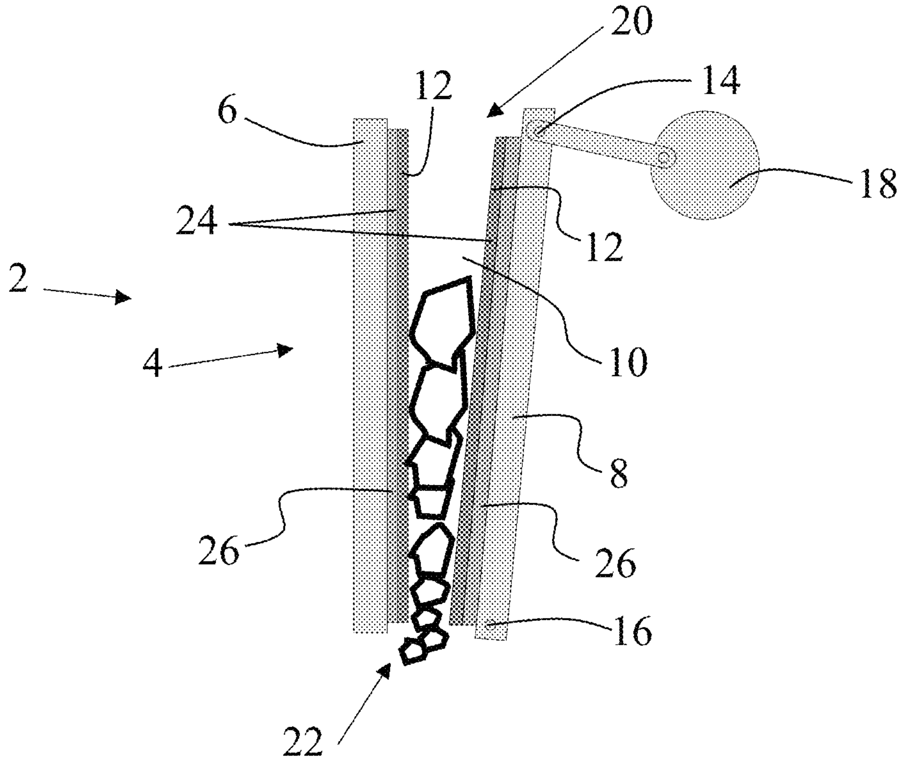

Referring first to FIGS. 1 and 2, there is a first embodiment of a rock crusher 2 that includes a primary crushing assembly 4, including a first, stationary side wall 6, a second, pivotable side wall 8, and a rock-receiving chamber 10 between the two walls. Each wall has a rock-crushing surface 12 that is in contact with rocks that are placed within the chamber. The pivotable side wall 8 includes an upper pivot pin 14 and lower pivot pin 16 which allow the pivotable side wall to pivot toward and away from the stationary side wall 6 via a rotary drive mechanism 18. This motion provides a primary crushing force to rocks that are placed in the chamber. The rocks are placed in the chamber via an upper end inlet 20. As the walls are moved toward and away from each other, rocks are crushed and moved downward toward a lower end outlet 22 until they are small enough to exit the device, as shown in FIG. 2.

In addition to the compression force provided from pivoting the pivotable wall toward the stationary wall, there is an auxiliary crushing assembly 24, which includes a pad of material 26 that provides a low frequency hydraulic force. As the primary crushing assembly 4 is operated via the rotary device 18, and the rock-crushing surfaces 12 are in contact with rocks, the hydraulic pad 26 is operated, causing vibration of the rock-crushing surfaces, which in turn increases the peak stress applied to the rocks. This results in rock crushing that requires less time, less energy, and less stress on the rock crusher 2. Though a hydraulic pad is used with the embodiment of FIGS. 1 and 2, it will be understood by those will skill in the art that other methods for providing a vibratory force could be used, for instance with piezoelectric material that provides a high-frequency vibratory force.

Figure 3:
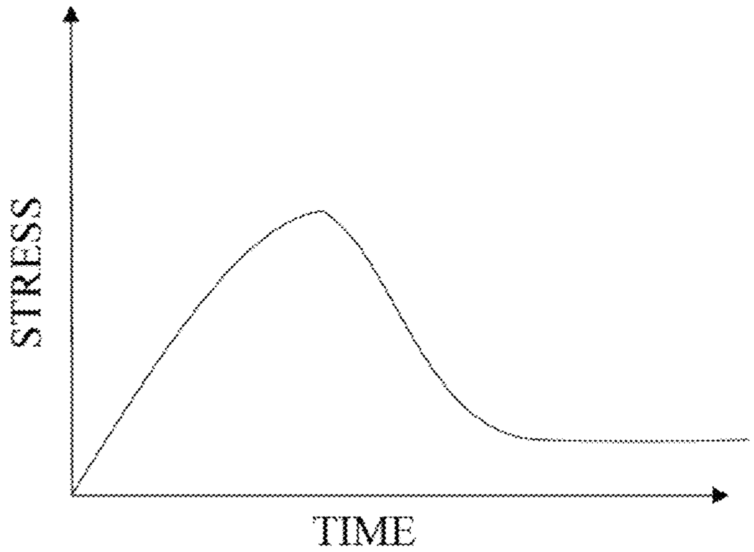
FIG. 3 includes a graph showing the stress of a rock over time as the result of compression force applied to the rock.
Figure 4:
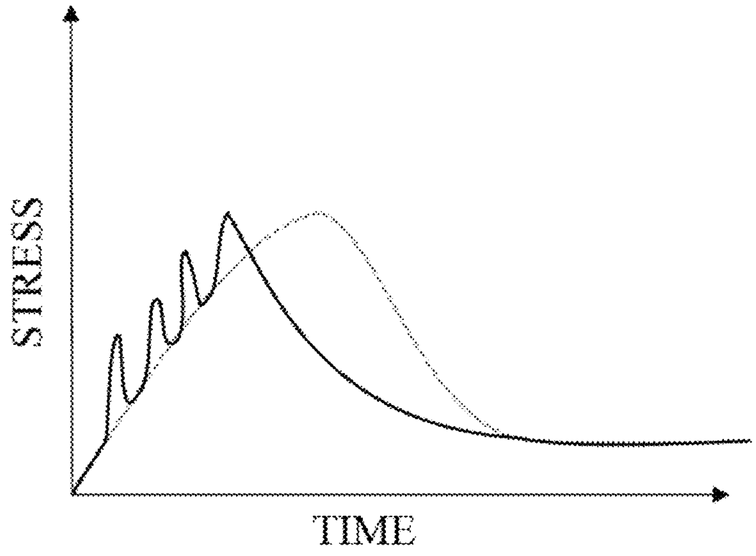
FIG. 4 includes a graph showing the stress of a rock over time as the result of a compression and vibratory force applied to the rock.

Referring now to FIGS. 3 and 4, there are two graphs showing stress of rocks over time when fractured via a standard rock crushing device and one with an auxiliary crushing mechanism. The compression force of a standard rock compression device, as with a jaw crusher or gyratory crusher, is shown in FIG. 3. Over time, the stress increases until the rock reaches a fracture point, at which time the rock is reduced into a smaller piece or pieces and the level of stress is greatly reduced. This cycle is repeated as rocks are crushed within the crushing chamber into smaller and smaller pieces. FIG. 4 shows the stress placed on a rock when an auxiliary crushing assembly applies a vibratory force in addition to the force of the primary assembly. As is shown, the vibratory force causes successive stress peaks that are greater than the stress applied by the primary compression force alone (shown in broken lines in FIG. 4). These stress peaks result in the threshold to fracture a rock being reached in less time than with a standard compression force device. This cycle is repeated as rocks are crushed into smaller pieces and/or new rocks are placed in the device chamber, resulting in significant time savings in the aggregate, as compared to rock crushers with a single crushing assembly.

Figure 5:
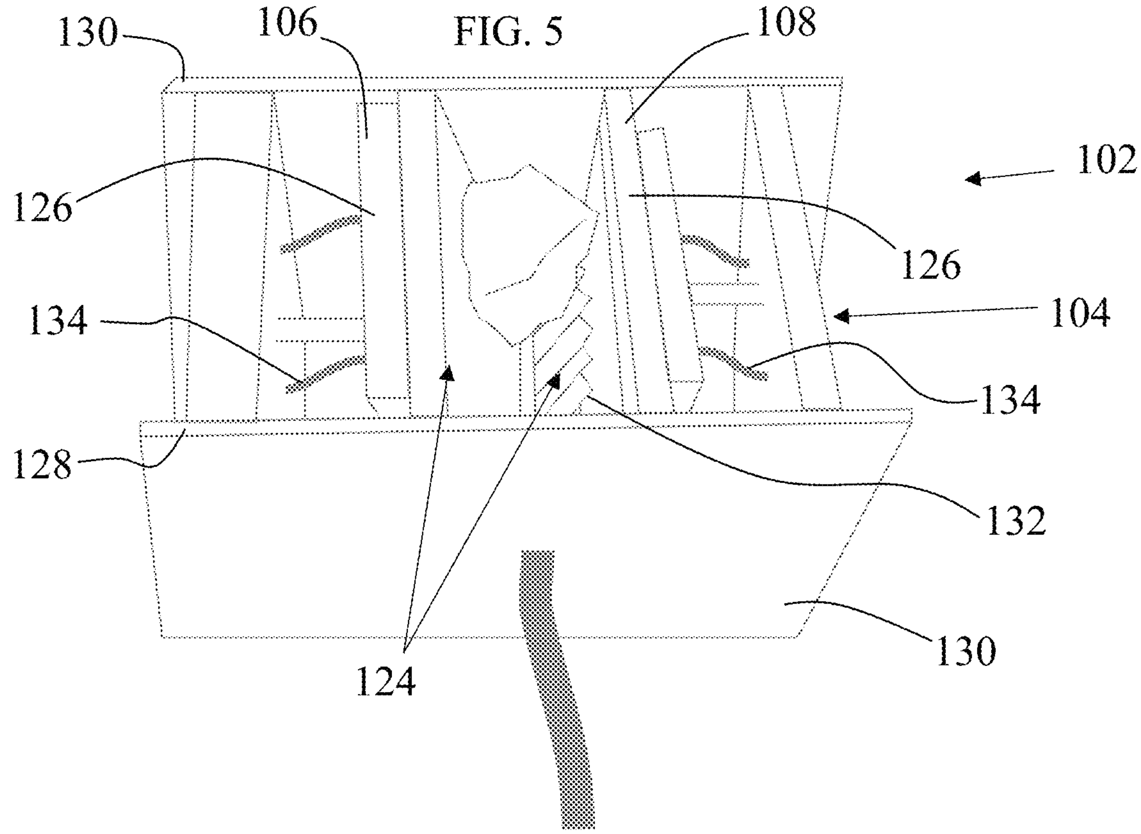
FIG. 5 shows a perspective view of a second embodiment of a rock crusher having primary and auxiliary crushing mechanisms.
Figure 6:
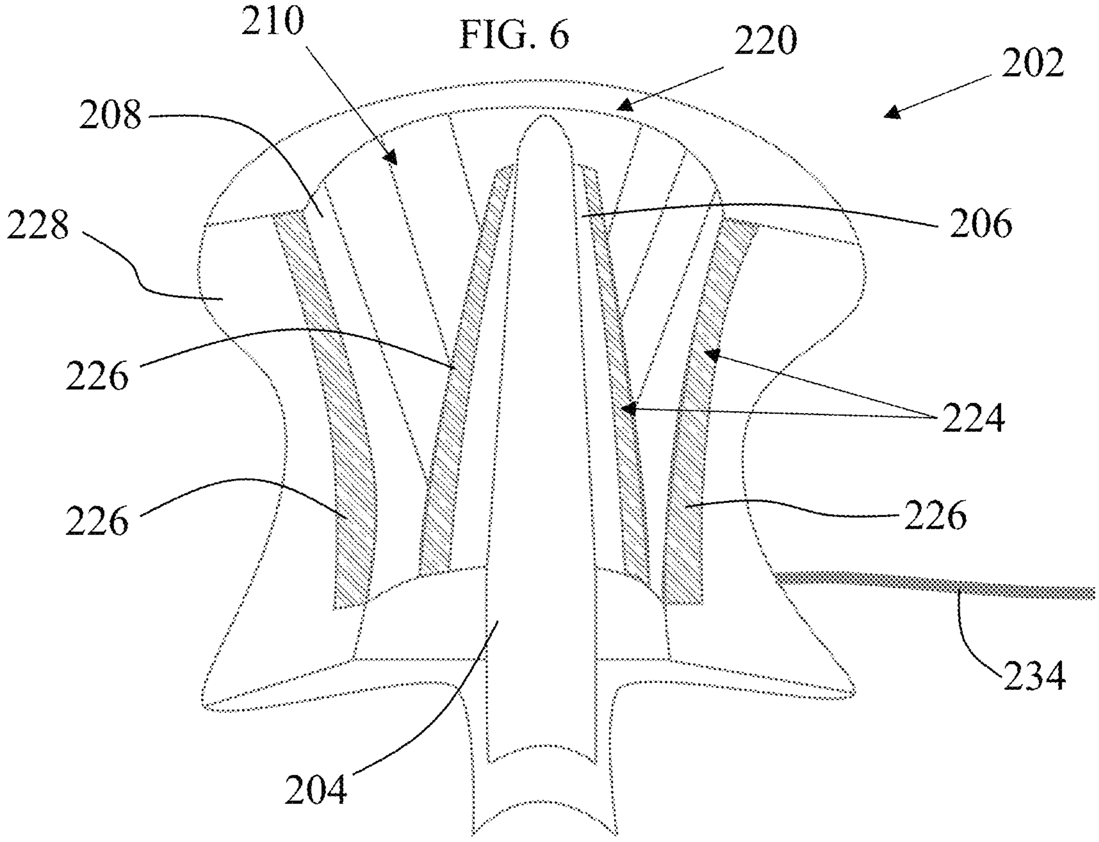
FIG. 6 shows a cross-sectional front view of a third embodiment of a rock crusher having primary and auxiliary crushing mechanisms.

FIGS. 5 and 6 show second and third embodiments, respectively, of rock crushers that have primary and auxiliary rock crushing assemblies. FIG. 5 shows a jaw crusher 102 with a rectangular housing 128 having a pair of parallel spaced side walls 130 and a primary rock crushing assembly 104 which includes pair of opposing compression plates 106, 108 arranged perpendicular to the side walls. One of the compression plates 108 includes teeth 132 to aid in crushing rock. In this embodiment, the compression plates are electrically and mechanically operated to provide a compression force to the rock. Specifically, the plates 106, 108 are compressed together to cause the rocks to fracture. In addition to the primary assembly, there is an auxiliary crushing assembly 124, which includes piezoelectric pads 126 attached to the back of each of the plates 106, 108 and a wire harness 134 connected with each piezoelectric pad. A signal is sent to the primary crushing assembly 104, operating the compression plates 106, 108 such that they are pushed toward each other, providing a compression force to the rock, resulting in stress on and ultimate fracture of the rock. Separately, as the compression force is applied, a signal is sent to the pads 126 of the auxiliary crushing assembly 124, resulting in a high frequency vibratory force applied to the rocks to increase the stress peaks, as shown in FIG. 4. The rock is then fractured at a rate that is greater than with the primary crushing assembly alone. Depending on the strength and size of the rocks, and thus their stress threshold, the auxiliary crushing assembly may or may not be operated.

The embodiment shown in FIG. 6 is a gyratory crusher 202 that also includes primary 204 and auxiliary 224 rock crushing assemblies. The gyratory crusher includes a generally circular housing 228 that has a moveable conical inner wall 206 and a stationary outer wall 208 that has a progressively narrowing inner diameter. The outer wall is concentrically arranged relative to the inner wall, and an inner chamber 210 is defined between the inner and outer walls. In use, rocks are inserted in the upper end inlet 220 and the machine is operated to fracture and reduce the size of the rocks as they travel down the chamber.

In addition to that primary rock crushing assembly 204, the embodiment shown in FIG. 6 includes piezoelectric material 226 attached to the inner 206 and outer 208 walls. The piezoelectric material receives an electric signal from a wire harness 234 connected with the housing 228 causing stretching and compression of the piezoelectric material and, in turn, vibration of the housing walls 206, 208. This vibration causes the rocks to reach their stress threshold at a quicker rate, thus fracturing the rocks more efficiently than with the primary crushing assembly alone.

Although the above description with reference to particular embodiments it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A rock crushing device, comprising:

(a) a housing including at least two walls defining a chamber having an upper inlet and a lower outlet, said at least two walls having a rock-crushing surface connected therewith, at least one of said walls being movable relative to another one of said walls to define a primary compression assembly for crushing rocks within said chamber via mechanical force; and (b) an independently operated auxiliary crushing assembly including a vibratory pad being connected with at least one of said at least two walls to deliver vibrations to said at least one wall for crushing rocks within said chamber via vibratory force, said vibratory pad being operated by a piezoelectric or a hydraulic force, said auxiliary crushing assembly being operable one of together with and independent of said primary compression assembly, whereby when rocks are inserted into the upper inlet of the rock crushing device and the rocks are crushed by the primary compression assembly and the auxiliary crushing assembly, the vibratory force of the auxiliary crushing assembly causes successive stress peaks that are greater than the stress peaks caused by the force of the primary compression assembly, thereby reaching a rock fracturing threshold in less time than the primary compression assembly alone.

2. A rock crushing device as defined in claim 1, wherein a distance between said at least two walls is greater at corresponding top portions of said walls than at corresponding bottom portions of said walls.

3. A rock crushing device as defined in claim 2, wherein said at least one movable side wall includes at least one pivot mechanism.

4. A rock crushing device as defined in claim 3, and further comprising a rotary drive mechanism connected with said pivot mechanism.

5. A rock crushing device as defined in claim 3, wherein said auxiliary crushing assembly provides variable frequency vibration forces.

6. A rock crushing device as defined in claim 1, wherein both of said at least two walls are movable.

7. A rock crushing device as defined in claim 1, wherein said auxiliary crushing assembly includes at least one said vibratory pad connected with each of said at least two movable walls.

8. A rock crushing device, comprising:

(a) a housing including at least two walls defining a chamber having an upper inlet and a lower outlet, said at least two walls having a rock-crushing surface connected therewith, at least one of said walls being movable relative to another one of said walls to define a primary compression assembly for crushing rocks within said chamber via mechanical force; and (b) an independently operated auxiliary crushing assembly including a vibratory pad being connected with at least one of said at least two walls to deliver vibrations to said at least one wall for crushing rocks within said chamber via vibratory force, said auxiliary crushing assembly being operable one of together with and independent of said primary compression assembly, whereby when rocks are inserted into the upper inlet of the rock crushing device and the rocks are crushed by the primary compression assembly and the auxiliary crushing assembly, the vibratory force of the auxiliary crushing assembly causes successive stress peaks that are greater than the stress peaks caused by the force of the primary compression assembly, thereby reaching a rock fracturing threshold in less time than the primary compression assembly alone.

* * * * *